May 9, 1950 A. W. HAYDON 2,506,784
ELECTRICAL TIMING SYSTEM
Filed Jan. 22, 1948 2 Sheets-Sheet 2

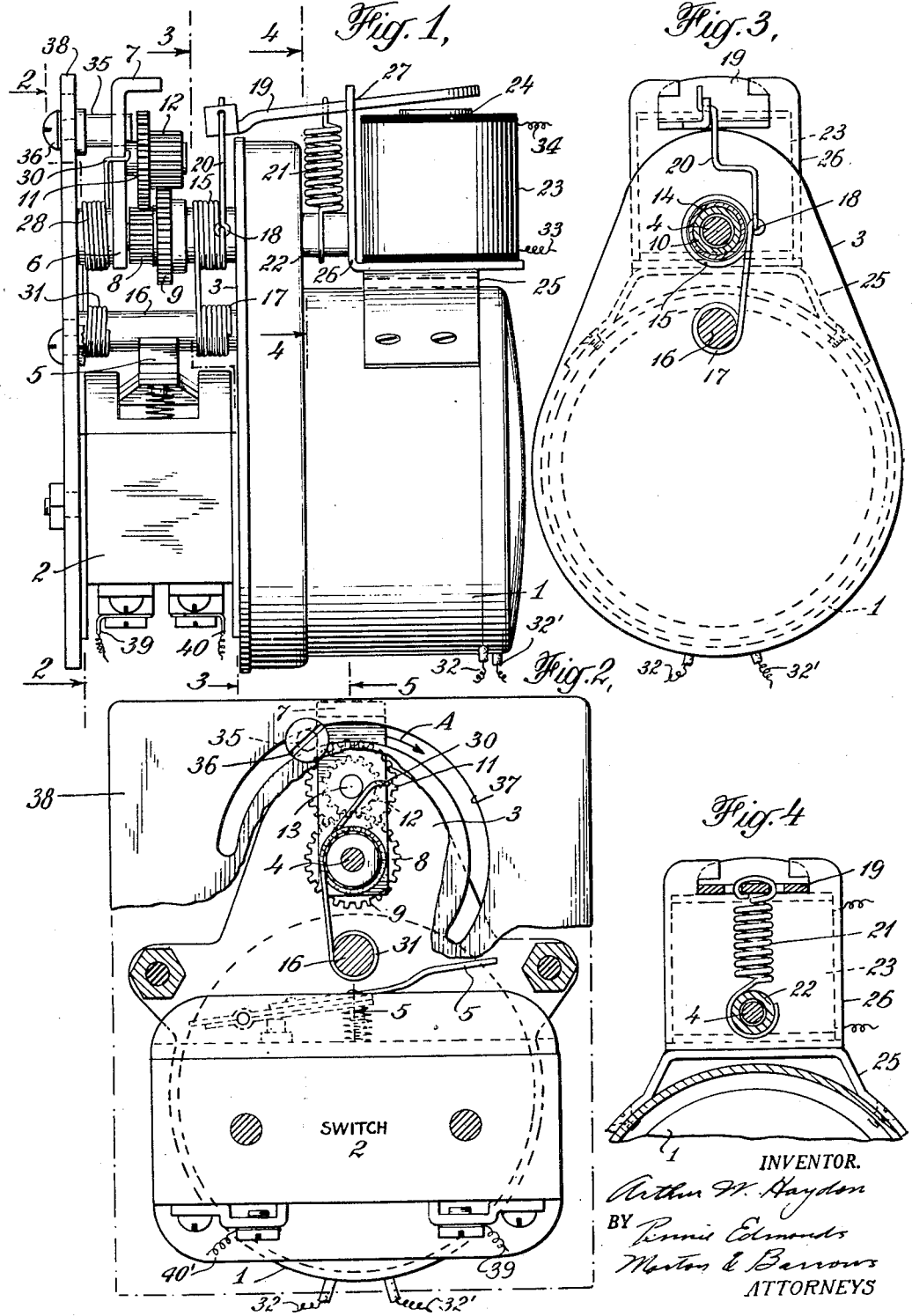

INVENTOR
Arthur W. Haydon
BY
Pennie Edmonds Morton & Barrows
ATTORNEYS

Patented May 9, 1950

2,506,784

UNITED STATES PATENT OFFICE 2,506,784

ELECTRICAL TIMING SYSTEM

Arthur W. Haydon, Marion, Conn.

Application January 22, 1948, Serial No. 3,777

14 Claims. (Cl. 74—781)

This invention relates to intermittently operated drive mechanisms and more particularly to improvements in motor driven switch operating timing devices of the type employed in timing various operations and for controlling electric switching operations.

In general my invention relates to improvements in timing devices of the type comprising a substantially constant speed drive such as an electric motor, one or more switches operated by the motor, and driving mechanism interconnecting the motor and one or more switch operating members, this driving mechanism including a brake for controlling the driving connection between the motor and the switch operating member or members. In timing devices of this type as heretofore constructed it has been common to employ either a toothed clutch, or gears arranged so that the gear teeth are brought into engagement to establish the desired driving connection, and so that one of the gears can be shifted to disengage the gears and break the driving connection. Such mechanisms are commonly provided with an automatic reset device so that the driving operation can be repeated as desired. The timing function is usually provided by the operation of the motor while the driving connection is established, the driving operation continuing until a switch actuating member driven by the motor closes or opens a control switch to stop the driving operation.

The gear shift type provides the desired positive drive but it has not proved to be entirely satisfactory because unless the gear shift mechanism is very delicately adjusted, the gear teeth will either fail to shift into mesh or fail to shift out of mesh. Binding of the gears or drying of the lubricant on the driving shaft may cause such failures.

Where the toothed clutch is employed the teeth must positively engage and drive the switch arm against the return force exerted by a reset spring and by the switch. This makes it desirable to use straight sided teeth, but when the current is interrupted, positive resetting must occur and the side thrust on the teeth due to the return spring tension and the pressure from the switch lever, tends to cause a binding or locking of the teeth. On the other hand, if the teeth are not straight sided teeth but inclined at an angle to facilitate separation of the teeth, this angularity reduces the positiveness of the drive during the timing operation. The ordinary toothed clutch is also objectionable because the elements have considerable mass and they are accordingly subject to accidental disengagement under vibration or shock which is encountered in aircraft and other applications.

One of the principal objects of this invention is to provide a timing device having an extremely low inertia brake mechanism for establishing the desired driving connection between the power drive and the intermittently operated driven element. Another object of this invention is the provision of a brake mechanism which insures efficient positive drive under all conditions of operation and which is of such a nature that the brake can be released without any danger of the brake elements becoming jammed or frozen in engagement with each other as is commonly experienced with clutch mechanism of the toothed type. A further object of the invention is the provision of brake mechanism which can be operated with a minimum expenditure of power. This makes it possible to actuate the brake by means of an electromagnet, or the like, of small dimensions and employing a minimum amount of energy.

Another object of this invention is the provision of an improved gear train arrangement in the driving connection between the motor and the switch-operating member. This improved gear train may be said to comprise a planetary gear arrangement. Thus a pivoted actuating arm may carry a pair of relatively fixed gears, one of which meshes with a motor driven pinion and the other of which meshes with a rotatably mounted gear associated with brake means which may be caused to prevent rotation thereof, thus causing the actuating arm to turn about its pivot mounting, carrying the relatively fixed gears with it.

As indicated above, my invention also comprises an improved brake mechanism. A typical embodiment of my invention may comprise a gear element fixed with respect to a rotatably mounted cylindrical sleeve, the external surface of which forms one cooperating element of the brake mechanism and the other brake element is preferably in the form of a wire or the like coiled about this sleeve so that it may be caused to grip the sleeve by a cinching action. The sleeve thus performs a function like that of a capstan and the several turns of wire about the sleeve can be caused to grip the sleeve firmly by virtue of the friction between the outer surface of the sleeve and the portions of the coil in contact with the sleeve. The gripping coil is preferably made of resilient wire of circular cross section. It has been found that a very slight force is all that is required to cause the cinching means to grip the rotatable sleeve. The instant the first turn begins to grip the sleeve, any tendency of the sleeve to rotate produces a further tightening of the coil on the sleeve and accordingly the only force required to operate the brake mechanism is that required to contract the coil until one portion of the coil tends to grip the sleeve. One end of the coil may be anchored to some fixed support. In order to release the brake it is merely necessary to discontinue the application of the force tending to tighten the coil on the sleeve, and apply a slight force in the direction tending to unwind the coil from the sleeve. At the instant when this unwinding action is initiated, the sleeve is at once freed from the grip of the coil and the timing mechanism is free to be reset by the action of the usual resetting spring or the like.

Typical embodiments of my invention are illustrated in the accompanying drawings in which Fig. 1 is a side elevation of a timing device embodying my invention;

Fig. 2 is a front elevation, partly in section, taken on line 2—2 of Fig. 1;

Fig. 3 is a vertical section view taken on line 3—3 of Fig. 1;

Fig. 4 is a fragmentary vertical section view taken on line 4—4 of Fig. 1;

Figure 5:
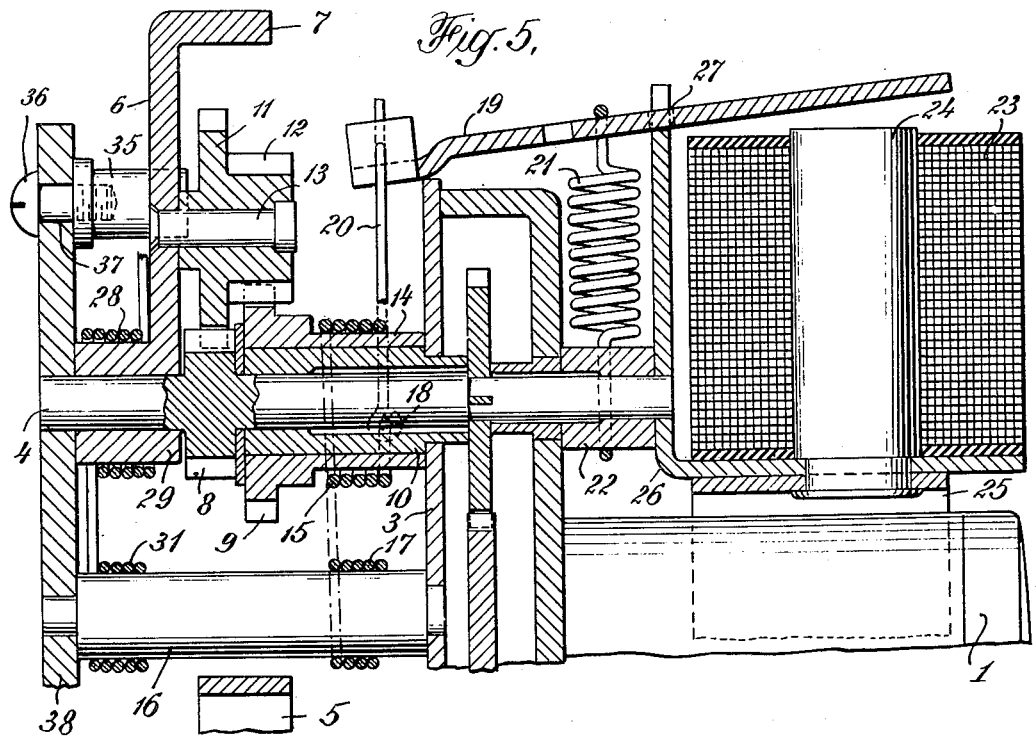
Fig. 5 is an enlarged fragmentary longitudinal section view taken on line 5—5 of Fig. 2.

The embodiment of my invention illustrated in Figs. 1-5, inclusive, comprises a motor enclosed in a motor housing 1 and switch mechanism enclosed in a housing 2. The details of construction of the motor and of the switch mechanism constitute no part of this invention and accordingly these details are not illustrated. It will be understood that the motor may be of any ordinary type such as a direct current motor or an alternating current motor, of sufficient capacity to drive a gear train and a switch actuating arm as hereinafter described. Gear housing 3 encloses a set of gears interconnecting the motor shaft with a driven shaft 4. The switch mechanism in the housing 2 is actuated by a lever member 5. The timing device includes a pivoted arm 6 mounted concentric with the driven shaft 4, and mechanism hereinafter described is provided for rotating this pivoted arm 6 through an angle until the free end of the arm 7 engages the switch operating lever 5 to operate switch mechanism in the housing 2 to open or close switch contacts in this housing as will be understood by those skilled in the art.

The pivoted arm 6 is rotated by what may be characterized as a planetary gear mechanism including a gear element or elements carried by the arm and cooperating with a pinion 8 fixed to the motor driven shaft 4 and with an idler gear 9 rotatably mounted on a bearing sleeve 10 forming one of the supports for the driven shaft 4. In the embodiment of my invention illustrated in Figs. 1-5 the gear element carried by the pivoted arm 6 may be regarded as consisting of gears 11 and 12 fixed with respect to each other and rotatably mounted on a stub shaft 13 fixed to the pivoted arm 6.

The gear 9 is fixed to a sleeve 14 rotatably mounted on the bearing sleeve 10 and having a cylindrical external surface forming one element of a brake. The other brake element comprises a coil of fine resilient wire, preferably of circular cross section, and having several turns extending around the sleeve 14 as shown in 15. One end of this wire may be secured to a binding post 16 as shown at 17 and the other end of this wire, as shown at 18, may be connected to the armature 19 of an electromagnet by a suitable linkage 20. The electromagnet armature 19 may be biased in the position shown in Fig. 5 by a spring 21 connected to a bearing element 22. The coil and core of the electromagnet are shown at 23 and 24, respectively, and these elements are carried by a suitable bracket 25 which may be mounted on the motor housing 1. The electromagnet armature 19 is pivoted on a bracket extension 26 as shown at 27.

The pivoted actuating arm 6 is engaged by a return spring 28 which may be loosely coiled around a cylindrical sleeve 29 integral with the pivoted arm. One end of the spring 28 engages the arm 6 as shown at 30 and the other end of the spring is fixed to the binding post 16 as illustrated at 31.

Suitable leads 32 and 32' are provided for supplying current to the electric motor in the motor housing 1 and current supply leads 33 and 34 are provided for the coil 23 of the electromagnet.

From the foregoing description it will be understood that when current is supplied to the electric motor, the shaft 4 will be driven by the motor through the gears in the gear housing 3. The pinion 8 on the shaft 4 drives the gear elements 11 and 12 mounted on the stub shaft 13 and if the electromagnet coil is deenergized the brake coil 15 will not grip the sleeve 14 and accordingly the gears 8, 11 and 12 will drive the gear 9 as an idler gear and no driving force will be applied to the pivoted arm 6. However, at the instant current is suppled to the electromagnet coil 23, the armature of this electromagnet is pulled toward the core 24 of the electromagnet to apply a force to the brake coil 15 which tends to tighten this coil about the sleeve 14.

As soon as this coil begins to grip the sleeve, the friction between this coil and the surface of the sleeve has a further tendency to tighten the coil on the sleeve and in this manner the coil grips the sleeve by a cinching action preventing rotation of this sleeve and of the gear 9 fixed with respect thereto. When this condition obtains, the operation of the electric motor causes the pivoted arm 6 to move in the direction of the arrow A (see Fig. 2). With the gear 9 thus held stationary and the pinion 8 rotating as the motor continues to operate, the relatively fixed gear elements 11 and 12 travel around the stationary gear 9 in planetary fashion and carry the arm 6 around until it engages the switch operating member 5. The angular distance traversed by the pivoted arm 6 determines the time interval of the timing device and the extent of this travel can be adjusted as desired by setting the initial position of the pivoted arm 6. This may be accomplished by employing an adjustable stop pin 35 and a set screw 36 passing through an arcuate slot 37 in a mounting plate 38.

The movement of the pivoted arm 6 may be arrested after it has engaged the switch operating member 5 by either deenergizing electromagnet coil 23 or by interrupting the supply of current to the motor. If the supply of current to the motor is interrupted without deenergizing the electromagnet, the pivoted arm 6 will be held with the free end 7 thereof in engagement with the switch operating member 5. Whenever the electromagnet is deenergized, however, the spring 21 will return the electromagnet armature 19 to the position shown in Figs. 1 and 5, thus releasing the brake coil 15 and permitting the pivoted arm 6 to return to its initial position by action of the return spring 28. The mechanism is thus automatically reset so that the timing operation can be repeated by again energizing the motor and the electromagnet.

Figure 6:
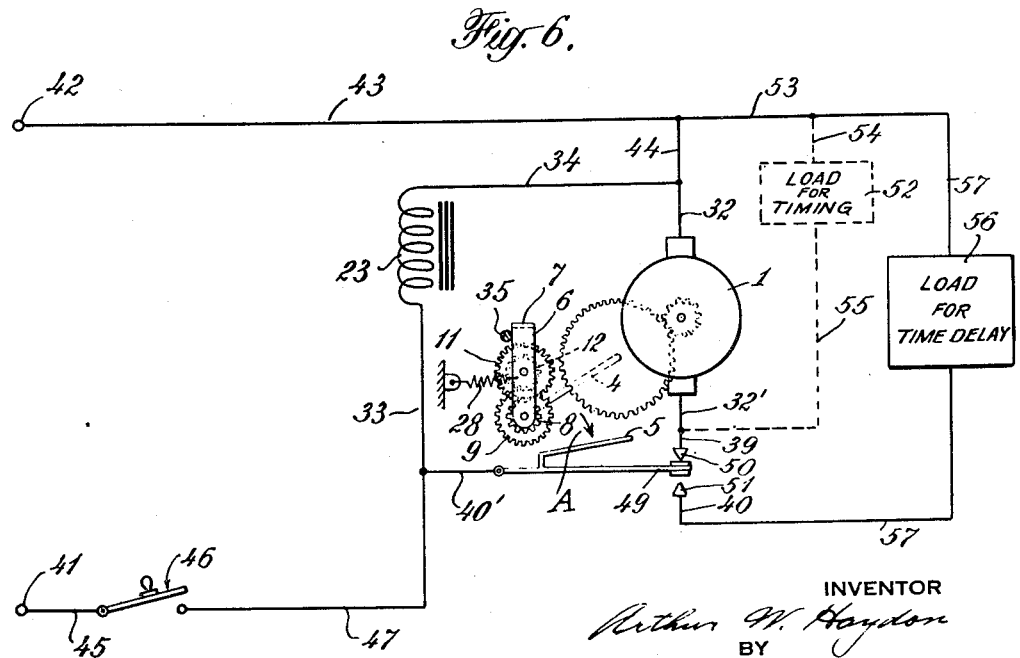
Fig. 6 is a circuit diagram illustrating typical applications of the invention.

The switching mechanism in the casing 2 is provided with the usual terminal leads such as those illustrated at 39, 40 and 40'. It will be understood by those skilled in the art that the motor leads 32, 32', the leads for the electromagnet 33, 34 and the lead wires 39, 40 and 40' for the switching mechanism may be connected in electric circuits in a variety of ways to accomplish various functions. Typical applications of the device are illustrated in Fig. 6 wherein the timing device is illustrated diagrammatically and the circuit connections are indicated for causing the device to perform a time delay function and a timing function. Thus in Fig. 6 circuit terminals 41 and 42 are connected to the motor leads 32 and 32' through wires 43, 44, 45, a switch 46, wires 47 and 40' and a switch contact 49 cooperating with contacts 50 and 51 of the switch mechanism. These switch contacts 49, 50 and 51 may be contacts of the switch mechanism enclosed in the casing 2 illustrated in Fig. 1. In Fig. 6 the leads 33 and 34 connected to the electromagnet coil 23 are shown connected to the circuit leads 47 and 44 respectively. A "load for timing" 52 is shown connected across the motor terminals by wire 53 and the wires 54 and 55 indicated by dotted lines. Similarly a "load for time delay" 56 is connected to one of the circuit terminals 42 by wires 57, 53, 43 and to contact 51 by wire 57.

In the arrangement illustrated in Fig. 6 the closing of the switch 46 supplies current from the circuit terminals 41 and 42 to the magnetizing coil 23 of the electromagnet and to the motor. Thus current is supplied to the magnetizing coil 23 of the electromagnet through the following circuit: terminal 41, wire 45, switch 46, wires 47, 33, coil 23 and wires 34, 44, 43 and terminal 42. Current is supplied to the motor through the following circuit: terminal 41, wire 45, switch 46, wires 47, 40', switch contacts 49, 50, wires 32', 32, 44 and 43 and terminal 42. As soon as the switch 46 is closed, the motor starts operating and the electromagnet is energized to operate the brake so that the brake coil 15 grips the sleeve 14 to hold the gear 9 stationary. Continued operation of the motor then causes the pivoted arm 6 to rotate in the direction of the arrow A in Fig. 6 until this contact strikes the switch operating element 5 which actuates the switch mechanism to break the motor circuit at contacts 49 and 50 and close the load circuit at contacts 49 and 51. The opening of the circuit at contacts 49 and 50 interrupts the supply of current to the motor so that the motor stops driving the pivoted arm 6. This arm is held in contact with the actuating member 5, however because the electromagnet coil 23 remains energized, thereby holding the gear 9 stationary through the brake comprising the brake coil 15 and the sleeve member 14. The opening of the contacts 49 and 50 also interrupts the supply of current to the "load for timing" 52. The closing of the switch 46 to energize the motor and the electromagnet also serves to supply current to the "load for timing" 52 through leads 53, 54 and 55 and accordingly current was supplied to this load circuit only during the time the motor was in operation driving the pivoted arm 6 until this arm actuated the switch operating member 5 to open the load circuit and stop the motor.

As soon as this action took place, current was supplied to the "load for time delay" 56, because of the closing of contacts 49 and 51. Thus current was supplied to this load circuit only after an interval of time determined by the operation of the timing device and current will continue to be supplied to the "load for time delay" 56 as long as the switch 46 remains closed. The opening of this switch 46 by manual or automatic means serves to interrupt the supply of current to the "load for time delay" 56 and also to deenergize the electromagnet coil 23 by interrupting the supply of current to this coil. As soon as this electromagnet coil is deenergized, the brake is released and the return spring 28 causes the pivoted arm 6 to swing back until it engages the adjustable stop pin 35. The timing mechanism is then in condition for repeating the timing operation which will be repeated upon closing the line switch 46 as described above.

It will be understood that my invention is not limited to the particular embodiments thereof illustrated and described in detail but includes such modifications thereof as fall within the scope of the appended claims.

I claim:

1. In a motor driven switch operating timing device, the combination of a switch operating member, a pivoted arm movable into engagement with said member, a pair of gears carried by said arm, said gears being fixed relative to each other a motor driven pinion meshing with one of said relatively fixed gears, a rotatably mounted gear meshing with the other of said relatively fixed gears, and a brake for preventing rotation of said rotatably mounted gear whereby the motor driven pinion moves said arm into engagement with said member.

2. In a motor driven switch operating timing device, the combination of a switch operating member, a pivoted arm movable into engagement with said member, a pair of gears carried by said arm, said gears being fixed relative to each other a motor driven pinion meshing with one of said relatively fixed gears, a rotatably mounted gear meshing with the other of said relatively fixed gears, and a brake for preventing rotation of said rotatably mounted gear whereby the motor driven pinion moves said arm into engagement with said member, the said pinion and the rotatably mounted gear being mounted in axial alignment with the axis of said pivoted arm.

3. In a motor driven switch operating timing device, the combination of a switch operating member, a pivoted arm movable into engagement with said member, a pair of gears carried by said arm, said gears being fixed relative to each other a motor driven pinion meshing with one of said relatively fixed gears, a rotatably mounted gear meshing with the other of said relatively fixed gears, and a brake for preventing rotation of said rotatably mounted gear whereby the motor driven pinion moves said arm into engagement with said member, the said brake comprising a sleeve member fixed with respect to said rotatably mounted gear and means for gripping said sleeve member to prevent rotation thereof.

4. In a motor driven switch operating timing device, the combination of a switch operating member, a pivoted arm movable into engagement with said member, a pair of gears carried by said arm, said gears being fixed relative to each other a motor driven pinion meshing with one of said relatively fixed gears, a rotatably mounted gear meshing with the other of said relatively fixed gears, and a brake for preventing rotation of said rotatably mounted gear whereby the motor driven pinion moves said arm into engagement with said member, the said brake comprising a sleeve member fixed with respect to said rotatably mounted gear and cinch means for gripping the outer surface of said sleeve member to prevent rotation thereof.

5. In a motor driven switch operating timing device, the combination of a switch operating member, a pivoted arm movable into engagement with said member, a pair of gears carried by said arm, said gears being fixed relative to each other a motor driven pinion meshing with one of said relatively fixed gears, a rotatably mounted gear meshing with the other of said relatively fixed gears, and a brake for preventing rotation of said rotatably mounted gear whereby the motor driven pinion moves said arm into engagement with said member, the said brake comprising a sleeve member fixed with respect to said rotatably mounted gear and cinch means for gripping said sleeve member to prevent rotation thereof, said cinch means comprising a resilient wire encircling said sleeve, and means for causing said wire to grip the surface of said sleeve.

6. In a motor driven switch operating timing device, the combination of a switch operating member, a pivoted arm movable into engagement with said member, a pair of gears carried by said arm, said gears being fixed relative to each other a motor driven pinion meshing with one of said relatively fixed gears, a rotatably mounted gear meshing with the other of said relatively fixed gears, and a brake for preventing rotation of said rotatably mounted gear whereby the motor driven pinion moves said arm into engagement with said member, the said brake comprising a sleeve member fixed with respect to said rotatably mounted gear and cinch means for gripping said sleeve member to prevent rotation thereof, said cinch means comprising a resilient wire of circular cross section encircling said sleeve, and means for causing said wire to grip the surface of said sleeve.

7. In a motor driven switch operating timing device, the combination of a switch operating member, a pivoted arm movable into engagement with said member, a pair of gears carried by said arm, said gears being fixed relative to each other a motor driven pinion meshing with one of said relatively fixed gears, a rotatably mounted gear meshing with the other of said relatively fixed gears, and a brake for preventing rotation of said rotatably mounted gear whereby the motor driven pinion moves said arm into engagement with said member the said brake comprising a sleeve member fixed with respect to said rotatably mounted gear and cinch means for gripping the outer surface of said sleeve member to prevent rotation thereof, the said cinch means comprising a resilient wire coiled about said sleeve, means for anchoring one end of the wire and means for applying tension to the other end of said wire to cause the same to grip the sleeve.

8. In a motor driven switch operating timing device, the combination of a switch operating member, a pivoted arm movable into engagement with said member, a pair of gears carried by said arm, said gears being fixed relative to each other a motor driven pinion meshing with one of said relatively fixed gears, a rotatably mounted gear meshing with the other of said relatively fixed gears, and a brake for preventing rotation of said rotatably mounted gear whereby the motor driven pinion moves said arm into engagement with said member the said brake comprising a sleeve member fixed with respect to said rotatably mounted gear, and cinch means for gripping the outer surface of said sleeve member to prevent rotation thereof, the said cinch means comprising a resilient wire encircling said sleeve and an electromagnet armature connected to said wire to cause the same to grip the sleeve.

9. In a motor driven switch operating timing device, the combination of a switch operating member, a pivoted arm movable into engagement with said member, a pair of gears carried by said arm, said gears being fixed relative to each other a motor driven pinion meshing with one of said relatively fixed gears; a rotatably mounted gear meshing with the other of said relatively fixed gears, and a brake for preventing rotation of said rotatably mounted gear whereby the motor driven pinion moves said arm into engagement with said member the said brake comprising a sleeve member fixed with respect to said rotatably mounted gear and cinch means for gripping the outer surface of said sleeve member to prevent rotation thereof, the said cinch means comprising a resilient wire coiled about said sleeve, means for anchoring one end of the said wire and an electromagnet armature connected to the other end of said wire to cause the same to grip the sleeve.

10. In a motor driven switch operating timing device, the combination of a switch operating member, a pivoted arm movable into engagement with said member, a pair of gears carried by said arm, said gears being fixed relative to each other a motor driven pinion meshing with one of said relatively fixed gears, a rotatably mounted gear meshing with the other of said relatively fixed gears, and a brake for preventing rotation of said rotatably mounted gear whereby the motor driven pinion moves said arm into engagement with said member, the said brake comprising a sleeve member fixed with respect to said rotatably mounted gear and cinch means for gripping the outer surface of said sleeve member to prevent rotation thereof, and means for causing said cinch means to release said sleeve.

11. In a motor driven switch operating timing device, the combination of a switch operating member, a pivoted arm movable into engagement with said member, a pair of gears carried by said arm, said gears being fixed relative to each other a motor driven pinion meshing with one of said relatively fixed gears, a rotatably mounted gear meshing with the other of said relatively fixed gears, and a brake for preventing rotation of said rotatably mounted gear whereby the motor driven pinion moves said arm into engagement with said member, the said brake comprising a sleeve member fixed with respect to said rotatably mounted gear and cinch means for gripping the outer surface of said sleeve member to prevent rotation thereof, the said cinch means comprising a resilient wire coiled around said sleeve, an electromagnet armature connected to said wire to cause the same to grip the sleeve when the electromagnet is energized, and means for causing said wire to release said sleeve when said electromagnet is deenergized.

12. In a motor driven switch operating timing device, the combination of a switch operating member, a pivoted arm movable into engagement with said member, a pair of gears carried by said arm, said gears being fixed relative to each other a motor driven pinion meshing with one of said relatively fixed gears, a rotatably mounted gear meshing with the other of said relatively fixed gears, and a brake for preventing rotation of said rotatably mounted gear whereby the motor driven pinion moves said arm into engagement with said member the said brake comprising a sleeve member fixed with respect to said rotatably mounted gear and cinch means for gripping the outer surface of said sleeve member to prevent rotation thereof, means for causing said cinch means to release said sleeve, and means for returning said pivot arm to its initial position.

13. In a motor driven switch operating timing device, the combination of a switch operating member, a pivoted arm movable into engagement with said member, gear means carried by said arm, a motor driven pinion meshing with said gear means, a rotatably mounted gear meshing with said gear means, and a brake for preventing rotation of said rotatably mounted gear whereby the motor driven pinion moves said arm into engagement with said member, the said brake comprising a sleeve member fixed with respect to said rotatably mounted gear and cinch means for gripping the outer surface of said sleeve member to prevent rotation thereof.

14. In a motor driven switch operating timing device, the combination of a switch operating member, a pivoted arm movable into engagement with said member, gear means carried by said arm, a motor driven pinion meshing with said gear means, a rotatably mounted gear meshing with said gear means, and a brake for preventing rotation of said rotatably mounted gear whereby the motor driven pinion moves said arm into engagement with said member, the said brake comprising a sleeve member fixed with respect to said rotatably mounted gear, a resilient wire coiled about said sleeve, and means for causing said wire to grip the surface of said sleeve.

ARTHUR W. HAYDON.

REFERENCES CITED

The following references are of record in the file of this patent:

UNITED STATES PATENTS

| Number | Name | Date |
| --- | --- | --- |
| 516,933 | Jacoby | Mar. 20, 1894 |
| 554,419 | Hall | Feb. 11, 1896 |
| 2,019,671 | Gille et al. | Nov. 5, 1935 |